April 4, 1967  R. S. MARK  3,312,392
CALCULATING MACHINE
Filed April 27, 1965  11 Sheets-Sheet 1
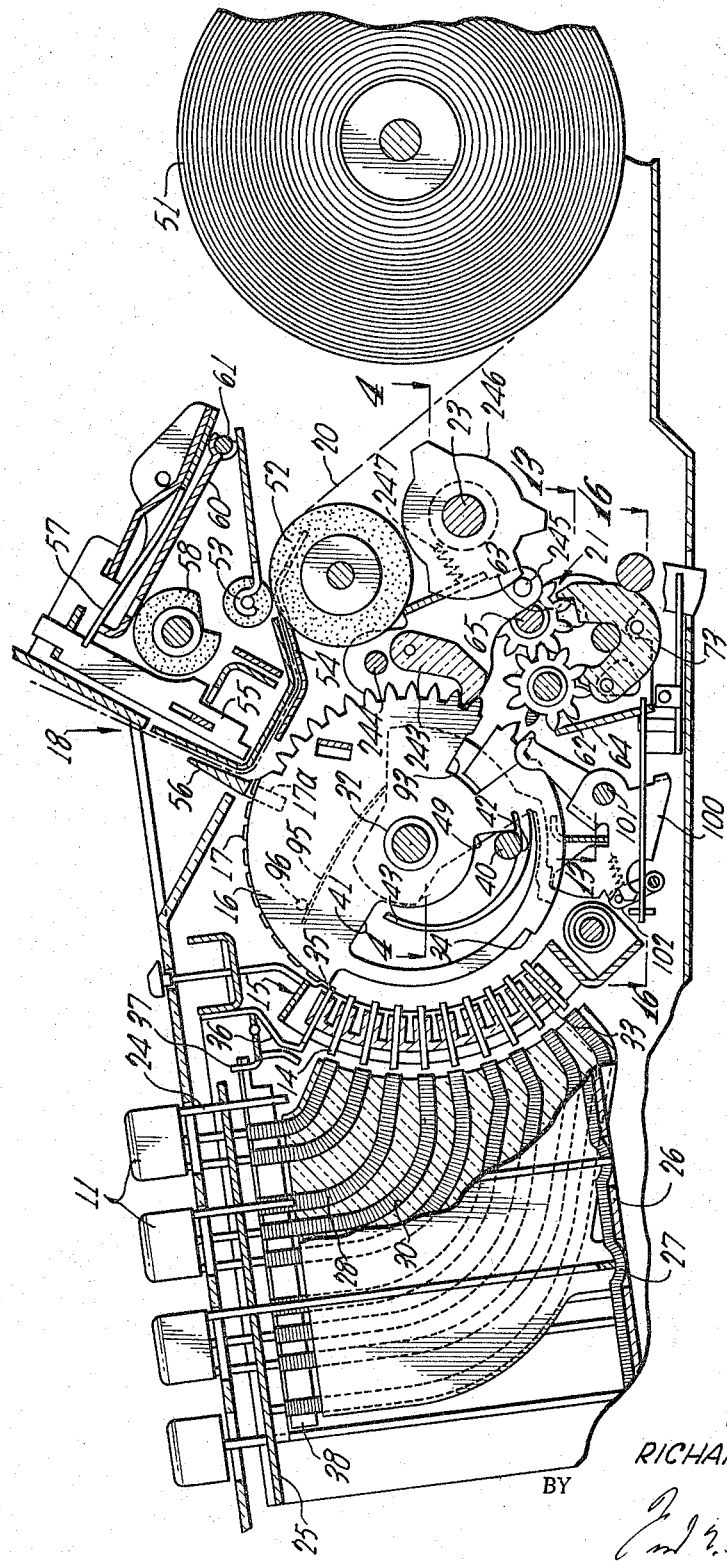
INVENTOR.
RICHARD S. MARK
BY
ATTORNEY.

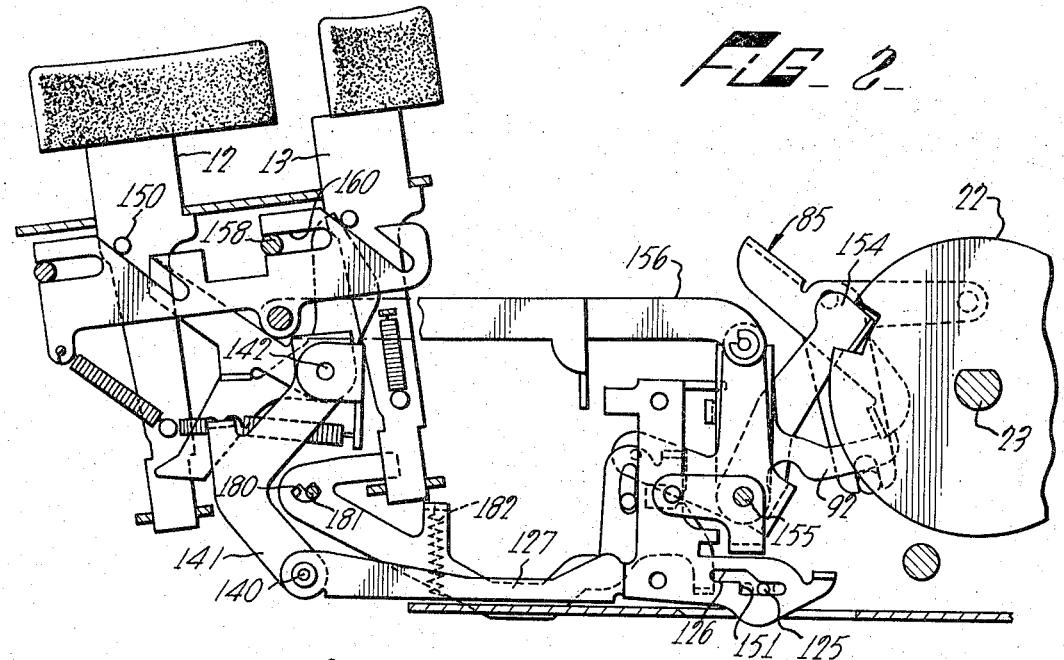
FIG_2_
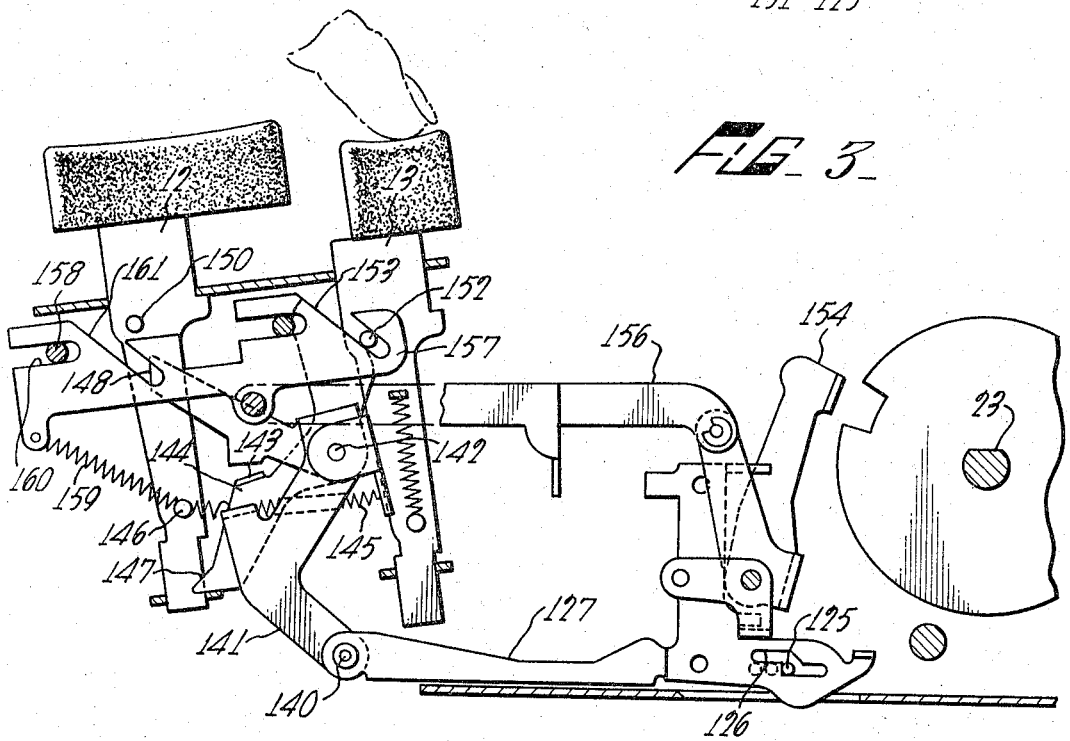
FIG_3_
INVENTOR.
RICHARD S. MARK
BY
ATTORNEY.

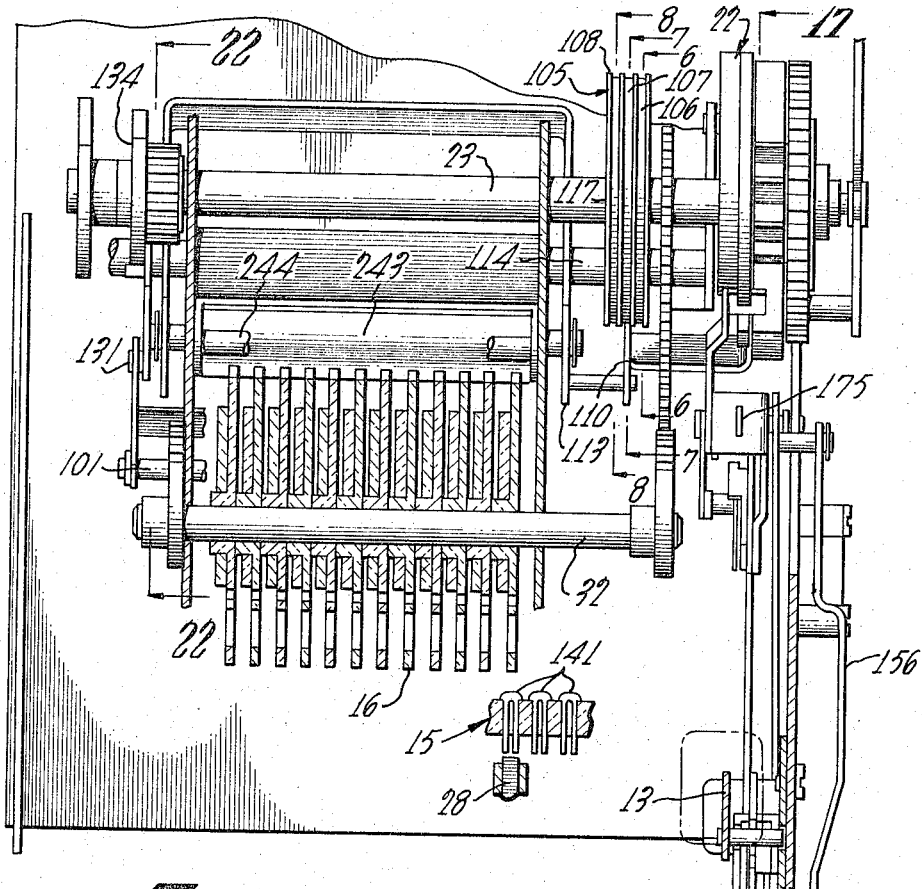
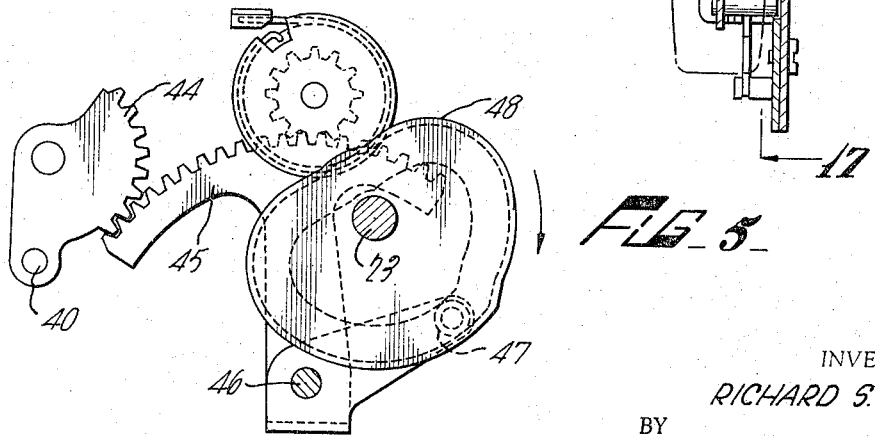

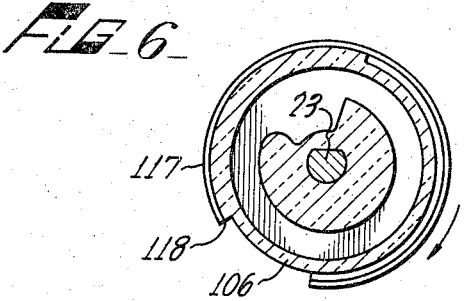
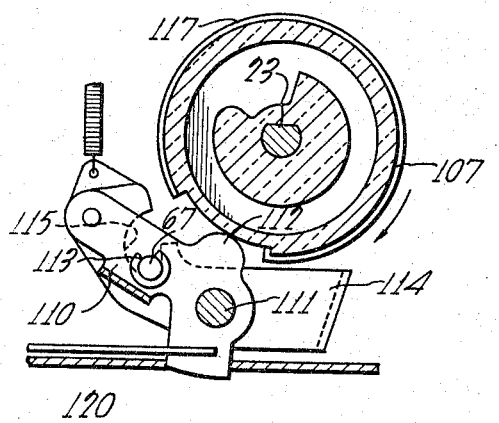
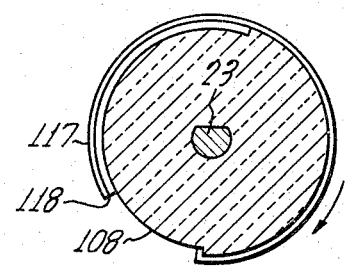
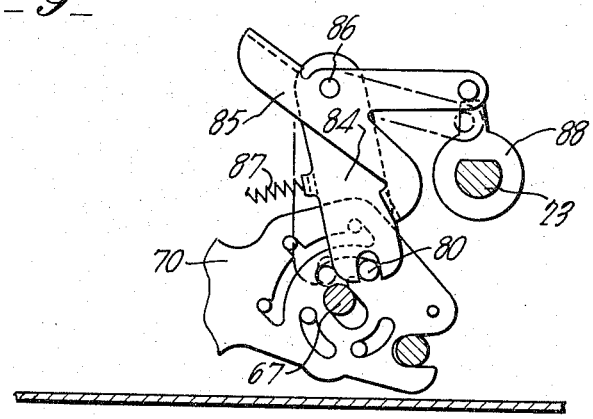

April 4, 1967  R. S. MARK  3,312,392
CALCULATING MACHINE
Filed April 27, 1965  11 Sheets-Sheet 5
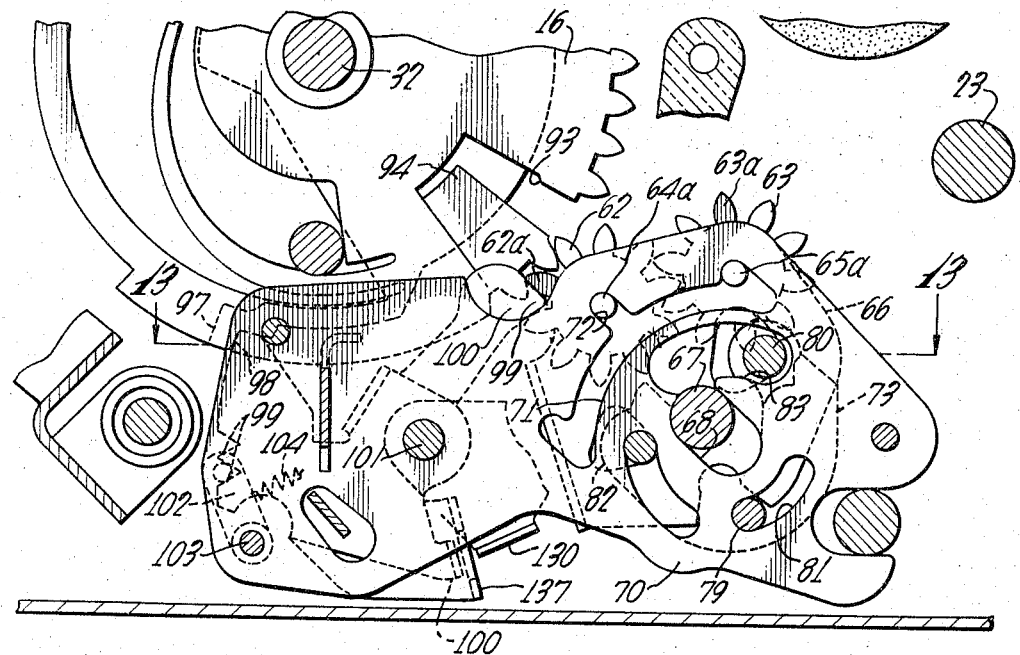
FIG_10_
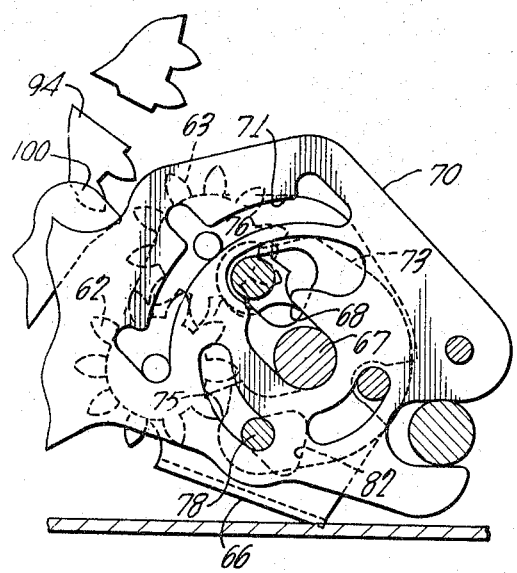
FIG_12_
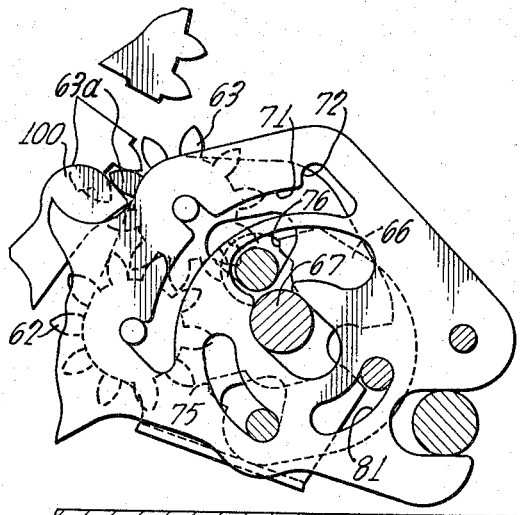
FIG_11_
INVENTOR.
RICHARD S. MARK
BY
ATTORNEY.

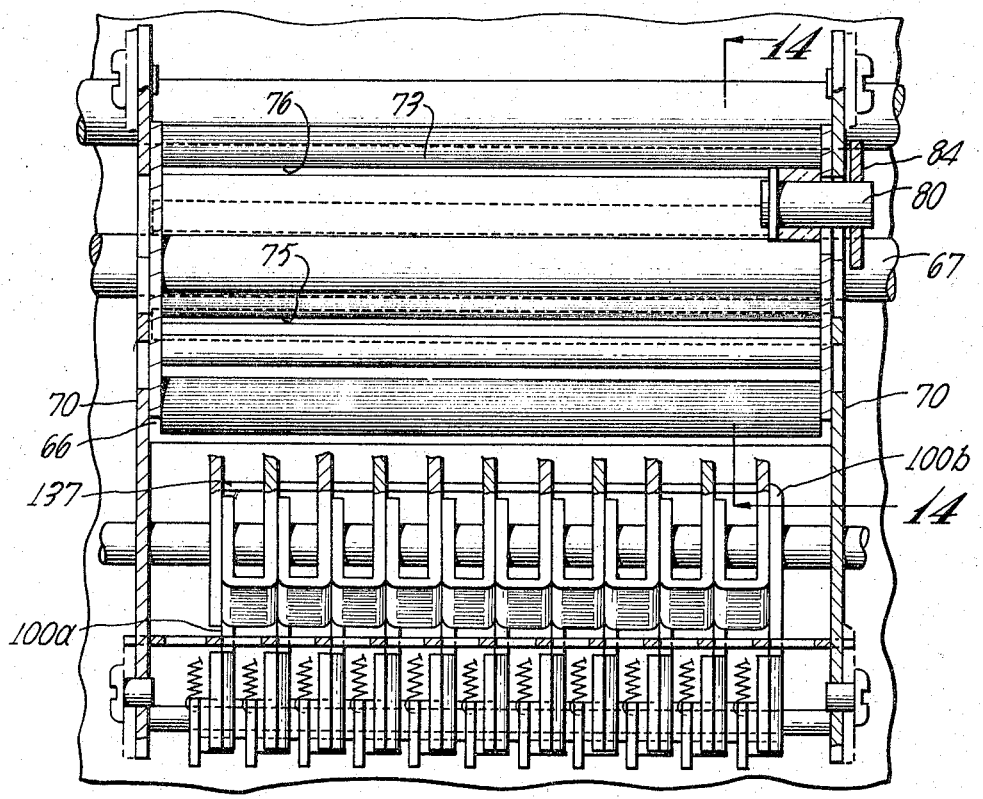
FIG_13_
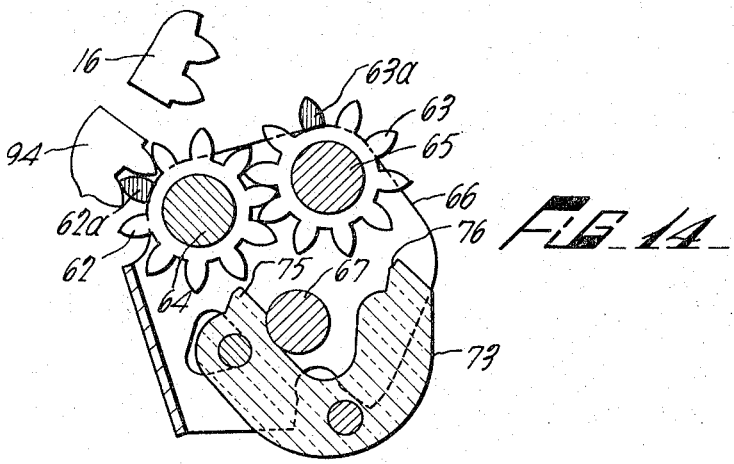
FIG_14_

April 4, 1967   R. S. MARK   3,312,392
CALCULATING MACHINE

Filed April 27, 1965   11 Sheets-Sheet 7

INVENTOR.
RICHARD S. MARK
BY
ATTORNEY.

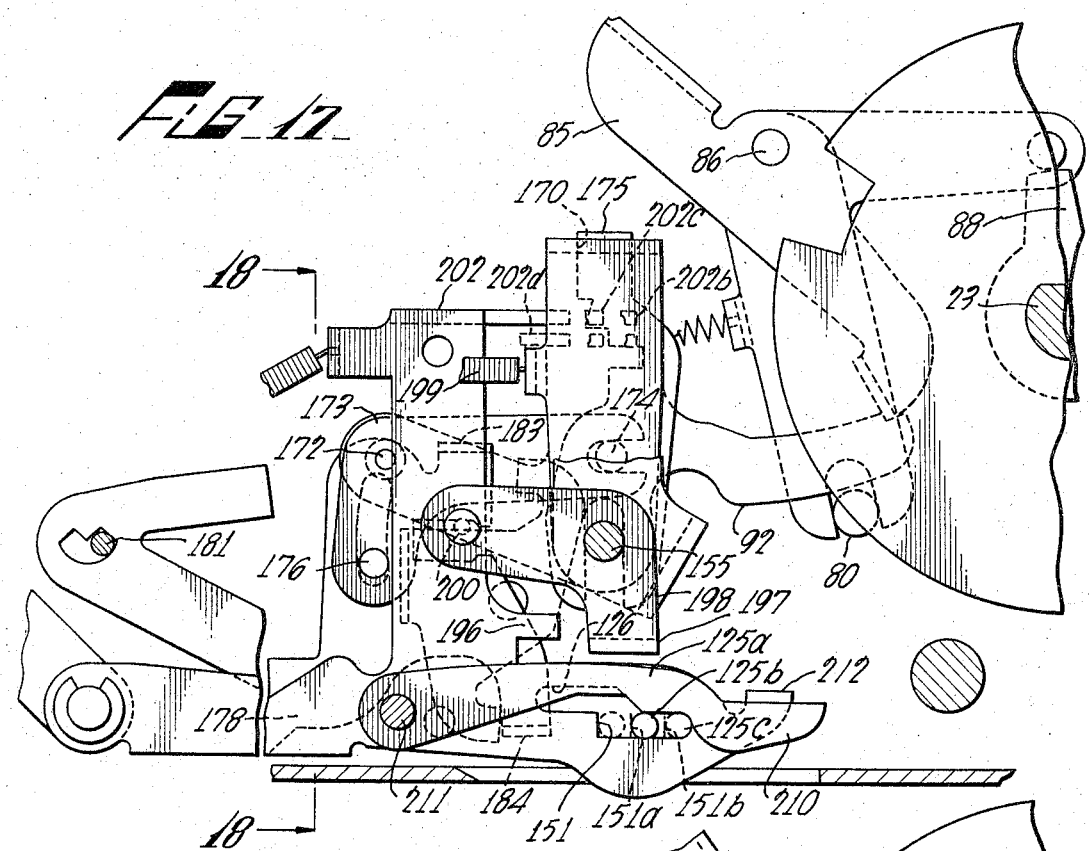
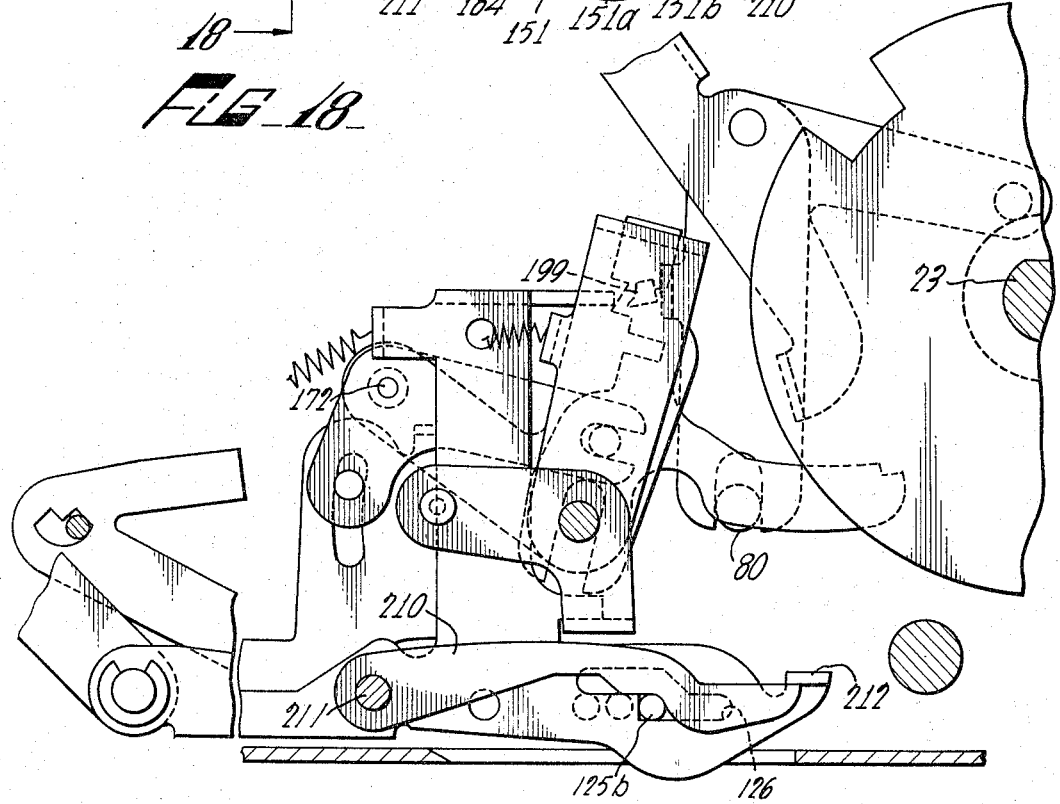

April 4, 1967 R. S. MARK 3,312,392
CALCULATING MACHINE
Filed April 27, 1965 11 Sheets-Sheet 9
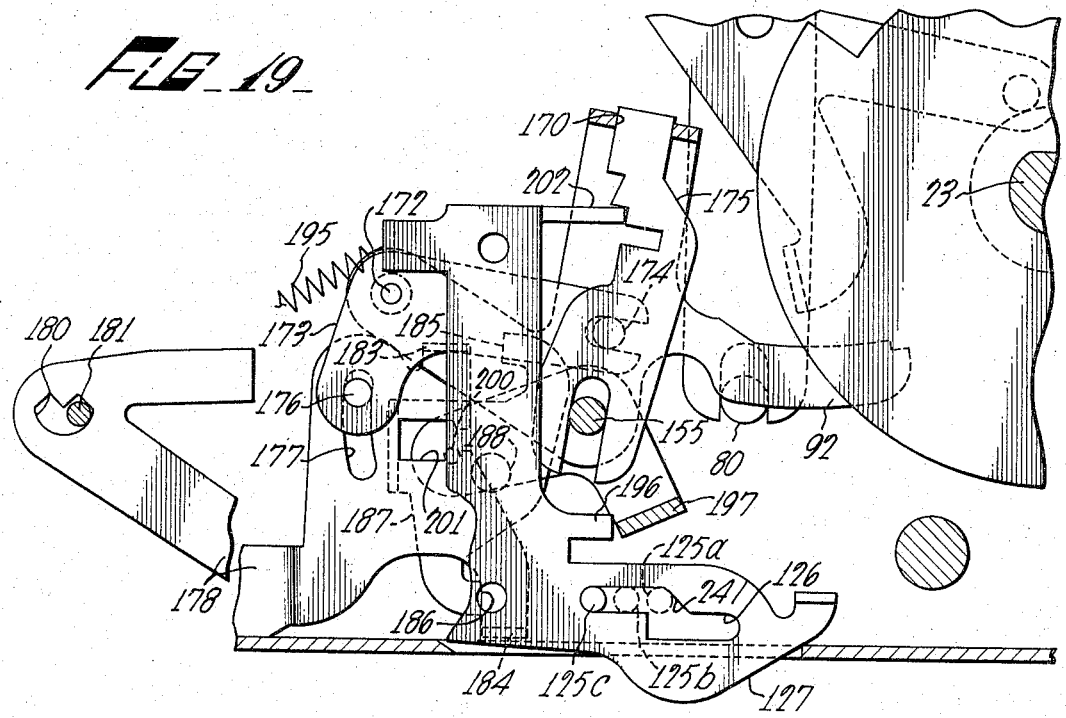
FIG_19_
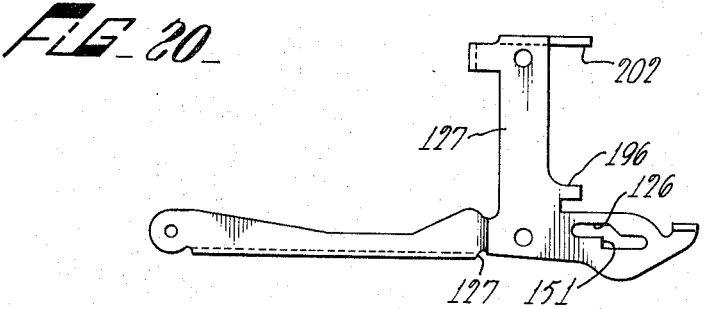
FIG_20_
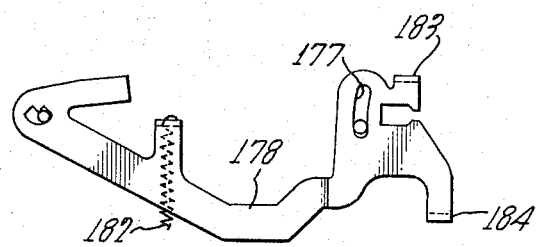
FIG_20A_
INVENTOR.
RICHARD S. MARK
BY
ATTORNEY.

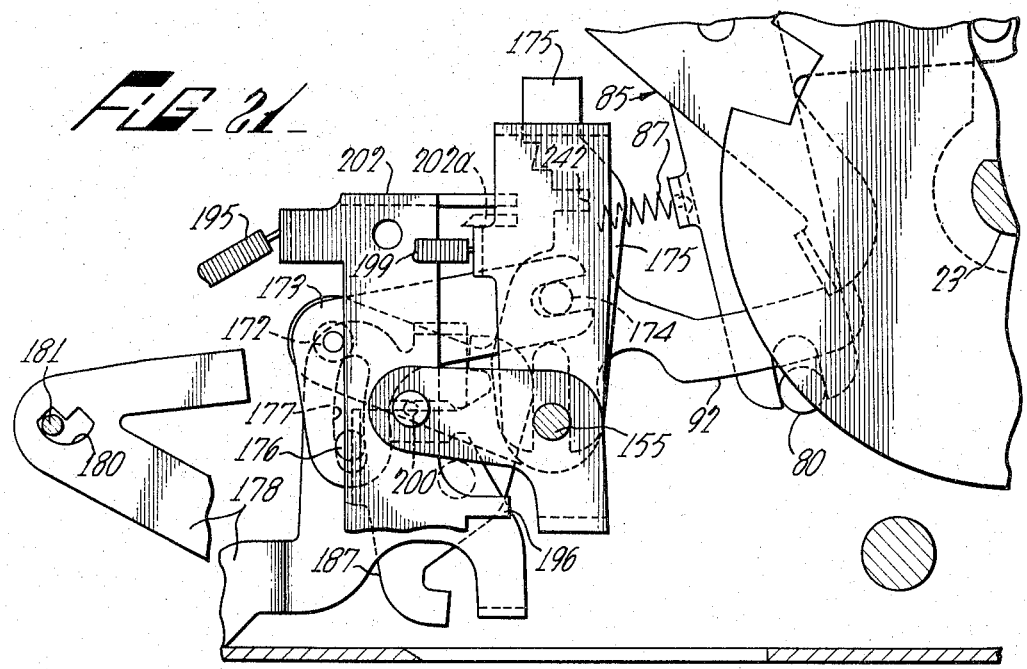
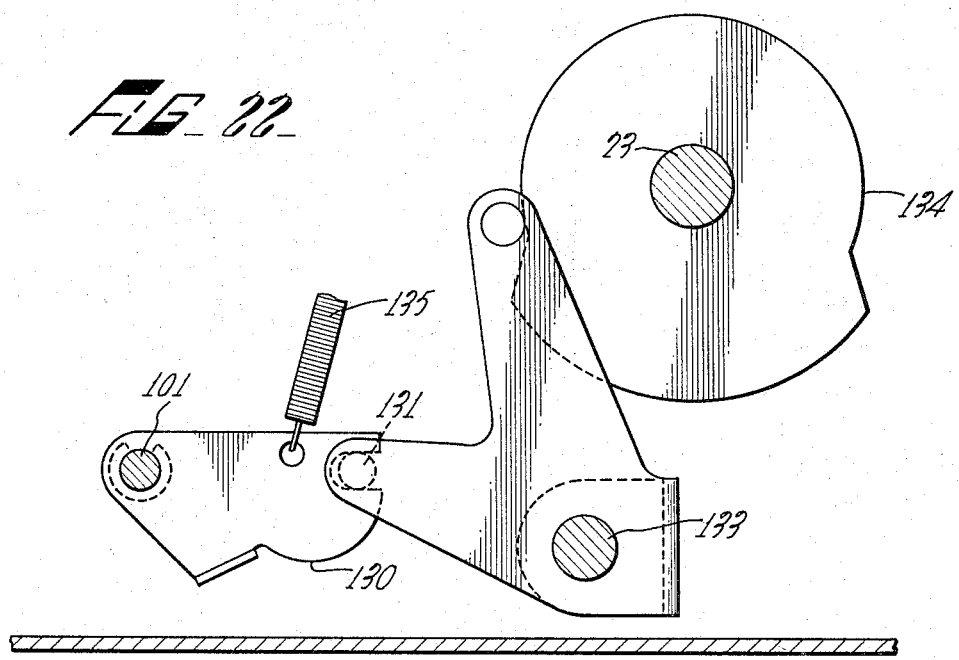

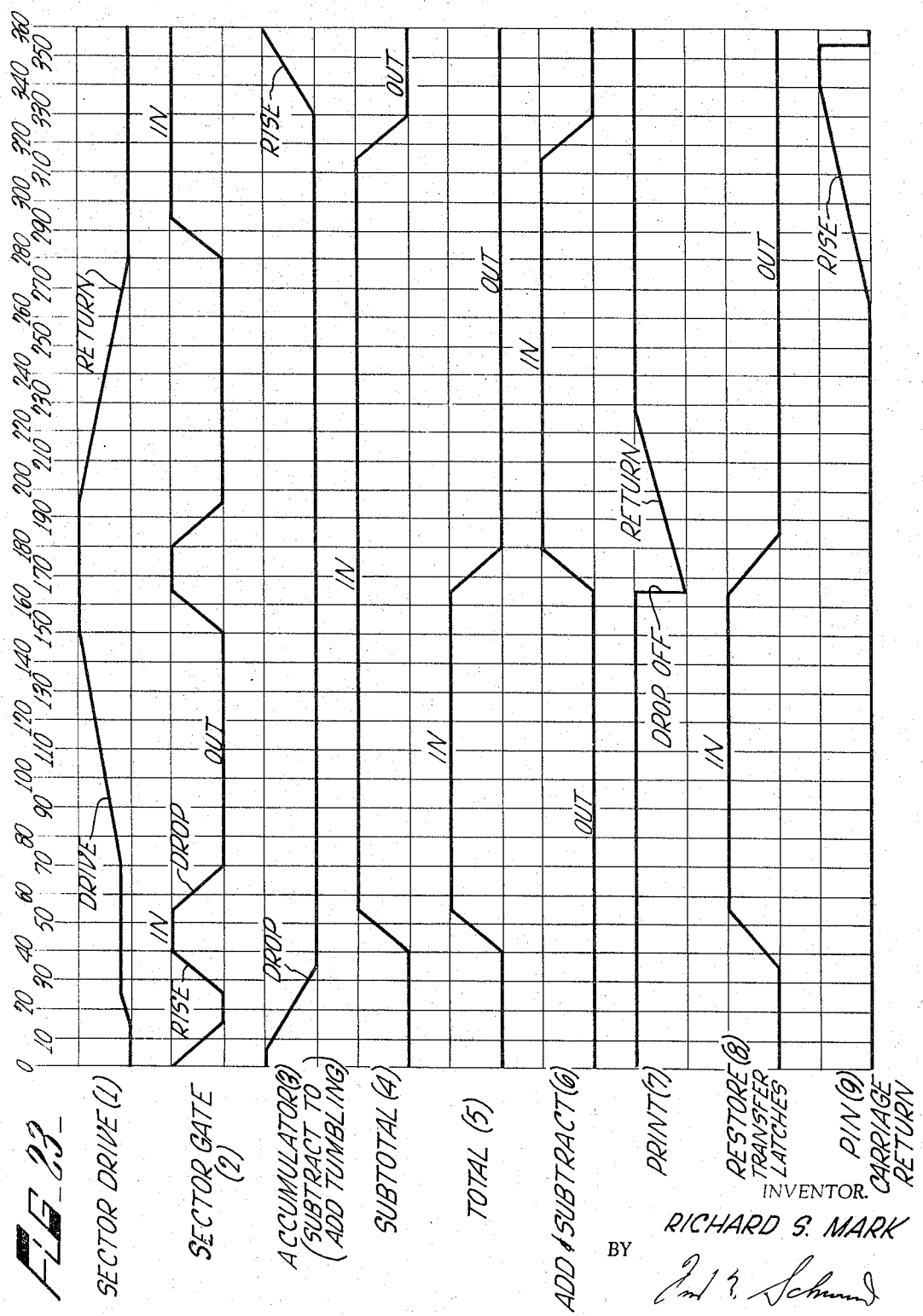

United States Patent Office 3,312,392
Patented Apr. 4, 1967

3,312,392
CALCULATING MACHINE
Richard S. Mark, Arcadia, Calif., assignor to Addmaster Corporation, San Gabriel, Calif., a corporation of California
Filed Apr. 27, 1965, Ser. No. 451,119
14 Claims. (Cl. 235—60)

This invention relates to motor driven calculating and adding machines and has particular reference to machines incorporating "combination" or double function control keys.

In such machines the add key, for example, when depressed, effects an add operation when an amount has been entered into the machine. However, when no amount has been entered, such key upon depression will effect a subtotal operation. Likewise, the subtract key is effective upon depression to cause a subtract operation when amounts have been entered in the machine and is effective to cause total operations when no amount has been entered.

Such machines have been very successful partly because of the reduction of the number of control keys necessary to control the machine to perform different functions. However, in adapting such machines to automatically produce true negative and positive totals or subtotals, depending on the condition of the accumulator, certain problems arise in attempting to enable such control keys to cause these operations. This is so because of the required triple function of each control key. For example, the add-subtotal key would be required to perform an add operation, a true negative subtotal operation or a positive subtotal operation, depending upon whether or not amounts were entered in the machine and on whether a positive or a negative amount is registered by the accumulator.

It therefore becomes a principal object of the present invention to provide a calculating machine including a control key capable of performing any of a plurality of different functions depending upon the condition of the machine.

Another object is to provide a calculating machine including a combination control key capable of automatically instituting true negative total or positive total operations.

The manner in which the above and other objects of the invention are accomplished will be readily understood on reference to the following specification when read in conjunction with the accompanying drawings, wherein:

FIG. 1 is a longitudinal section view of an adding machine embodying a preferred form of the present invention.

FIG. 2 is a sectional side view of certain of the machine controls.

FIG. 3 is a view similar to FIG. 2 but showing the minus-total key depressed.

FIG. 4 is a sectional plan view through the machine and is taken substantially along the line 4—4 of FIG. 1.

FIG. 5 is a side view illustrating the sector drive mechanism.

FIG. 6 is a sectional view through the add-subtract control cam and is taken along the line 6—6 of FIG. 4.

FIG. 7 is a sectional view through the sub-total control cam and associated cam follower and is taken along the line 7—7 of FIG. 4.

FIG. 8 is a sectional view of the total control cam and is taken along the line 8—8 of FIG. 4.

FIG. 9 is a sectional view illustrating the mechanism for tumbling the accumulator between add and subtract conditions.

FIG. 10 is a sectional view through the central portion of the machine, illustrating the accumulator in add condition and in engagement with the actuating sectors.

FIG. 11 is a view similar to FIG. 10 but illustrating the accumulator in a subtract condition.

FIG. 12 is a sectional view similar to FIG. 11 illustrating the accumulator in subtract condition but out of engagement with the drive sectors.

FIG. 13 is a sectional view through the lower portion of the accumulator and is taken substantially along the line 13—13 of FIG. 1.

FIG. 14 is a sectional view through the accumulator illustrating the same in an add condition and in engagement with the drive sectors.

FIG. 17 is a side view illustrating part of the accumulator controls and is taken substantially along the line 17—17 of FIG. 4.

FIG. 18 is a view similar to FIG. 17, but illustrating the parts in position set by depression of the minus-total key.

FIG. 19 is a view similar to FIGS. 17 and 18 but illustrating the parts in conditions resulting from movement of the pin carriage out of its home position and depression of the minus-total key.

FIG. 20 is a detail view of one of the links for controlling the accumulator.

FIG. 20A is a detail view of another of the links for controlling the accumulator.

FIG. 21 is a view similar to FIGS. 17 to 19 but illustrating the parts in positions resulting from location of the accumulator in positive condition.

FIG. 22 is a side view illustrating the mechanism for resetting the transfer latches.

FIG. 23 is a timing diagram of the machine.

*General design*

Figure 15:
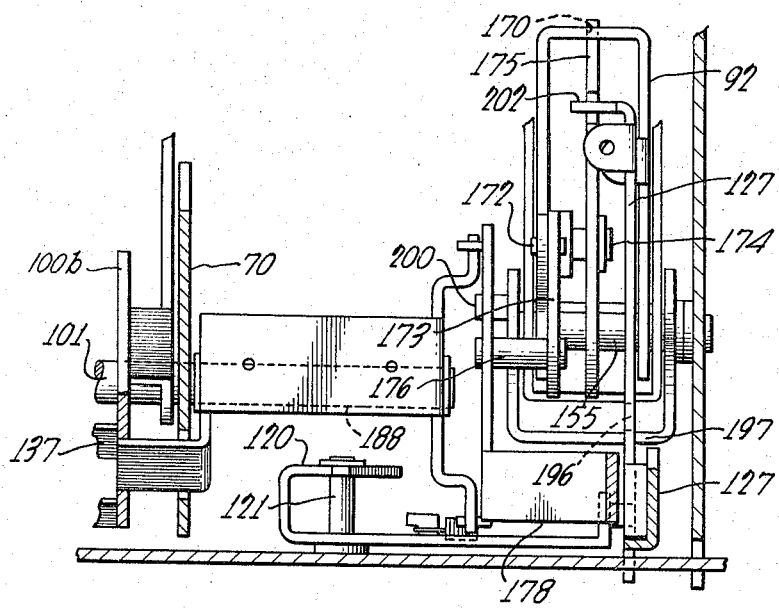
FIG. 15 is a sectional view taken transversely through the machine and substantially along the line 15—15 of FIG. 17, illustrating the fugitive one entry bail and control mechanism associated therewith.

Referring to the drawings, the machine is of the ten key type wherein the digits of an amount are entered sequentially through amount keys, certain of which are illustrated at 11 (FIG. 1), the keys ranging in value from 0 to 9. Operation of the machine to perform entry, total and sub-total functions is controlled by two operation control keys 12 and 13 (FIGS. 2 and 3).

If an amount has been entered via the keys 11, depression of the key 12 will cause an additive entry operation, and depression of the key 13 will cause a subtractive entry operation. On the other hand, if no amount has been entered into the machine, depression of the key 12 will result in a sub-total operation and depression of the key 13 will result in a total operation.

Depression of an amount key sets up an appropriate stop pin 14 (FIG. 1) in a pin carriage generally indicated at 15, which shifts laterally into cooperative relation with a group of printing sectors 16 (see also FIG. 4). Each of the latter carries a series of type 17 on its periphery, ranging from 0 to 9, the 0 character being located at the clockwisemost location relative to the rest of the series.

The printing sectors cooperate with a printing mechanism generally indicated at 18 to print amounts registered by the sectors onto a paper strip 20. The sectors 16 also cooperate with an accumulator generally indicated at 21 to enter amounts therein or to remove accumulated amounts during totaling and sub-totaling operations. According to the present invention true algebraic amounts registered by the accumulator are totaled or sub-totaled regardless whether such amounts are of a positive or negative nature. The machine is driven by an electric motor (not shown) through a cyclically operable clutch generally indicated at 22 (FIG. 4). The clutch is effective to drive a main shaft 23 one complete revolution in a clockwise direction during each cycle of operation. The shaft carries various drive elements for operating different units of the machine in proper timed relation.

Keyboard

The amount keys 11 (FIG. 1) are mounted on key stems 24 slideable vertically in slots formed in key frame plates 25 and 26. Tension springs 27 attached at their ends to the lower frame plate 25 extend under the key stems to normally hold the amount keys in their illustrated raised positions.

Each key stem has an extension which is attached to the upper end of a respective flexible cable 28. The various cables are vertically aligned with each other and are slideably mounted in grooves 30 formed in a guide block 31 suitably supported by the machine framework. The cables terminate in an arcuate pattern concentric of a shaft 32 rotatably supported in bearings formed in the machine framework.

Pin carriage

The pin carriage 15 is formed of an arcuate body 33 slideably mounted for movement transversely of the machine and has a plurality of vertical columns of stop pins 14 therein extending radially of the shaft 32 and slideable endwise in grooves in the pin carriage. The stop pins are located in horizontal rows aligned with the lower ends of respective ones of the flexible cables 28. Thus, upon depression of a selected amount key its cable 28 will move endwise to depress an aligned stop pin 14 to a position wherein it forms an abutment in the path of a shoulder 34 formed on an aligned sector 16. Pins 14 frictionally engage the sides of their respective grooves and thereby remain in adjusted positions until returned in the later stage of a machine cycle by means not shown.

An additional horizontally arranged row of escapement pins 35 is provided. Such pins are aligned with the vertical columns of similar stop pins and are movable endwise by a finger 36 of a bail 37 which is pivotally supported for movement about a horizontal axis extending transversely of the machine. The bail 37 is actuated by a universal bail 38 which is pivotally supported for movement about a substantially horizontal axis extending longitudinally of the machine. The bail 38 is actuated by each of the keys 11 upon depression thereof.

Spring means (not shown) urges the pin carriage to the left, as viewed in FIG. 4, whereupon the leftmost unset escapement pin abuts a locating shoulder (not shown).

Upon depression of any of the amount keys 11 to set a respective stop pin 14, the bail 38 is rocked to cause bail 37 to set the aligned escapement pin, whereby the pin carriage may escape one column to the left.

Toward the end of a machine cycle, means (not shown) returns the pin carriage to the right into its position partly shown in FIG. 4 wherein the lefthand column of pins therein is aligned with the ends of the cables 28.

Printing sector drive

The various printing sectors 16 are independently and rotatably mounted on the shaft 32 and are yieldably driven clockwise from their positions shown in FIG. 1 by a bail rod 40 (FIGS. 1 and 5). The latter extends through openings 41 in the sectors and is normally engaged by a shoulder 42 formed on a flexible tail 43 integral with each sector.

The bail rod 40 is supported at its outer ends by gear sectors, one of which is shown at 44 (FIG. 5). The latter meshes with a second gear sector 45 pivoted at 46 and carrying a cam follower roller 47 which engages a cam groove formed in a cam 48 which is suitably attached to the cyclically operable drive shaft 23.

As noted by Item 1 in the timing diagram of FIG. 23, the bail rod 40 normally holds the sectors in their sub-zero positions shown in FIG. 1 wherein the 0 characters 17a are each located one increment counterclockwise of the print line formed by endwise movable hammers 55.

During a period extending from 15 to 25 degrees of a machine cycle, the bail rod is advanced to locate the 0 type characters 17a at the print line. Thereafter, at 70 degrees the bail rod will be advanced during a period extending from 70 to 150 degrees to yieldably rotate the sectors 16. During this period, the sectors strike depressed ones of the stop pins 14 in digit entry operations or are arrested by associated accumulated gears as the latter are returned to 0 during totaling or sub-totaling operations, as will be described later on.

From 195 to 280 degrees the bail rod 40 will be driven counterclockwise to its home position of FIG. 1. During this period the bail rod 40 will engage a shoulder 49 on each of the sectors to return them to their sub-zero positions shown in FIG. 1.

The sectors 16 are locked against movement when the machine is in full cycle position and shortly after the start of a cycle, i.e., between 40 and 55 degrees; also, during the period between 165 and 180 degrees (see Item 2 of FIG. 23). For this purpose, a locking aligner 243 is pivotally supported at 244 and carries a cam follower roller 245 held against a cam 246 by a tension spring 247. The cam 246 is mounted on the shaft 23.

Printer and paper feed

The paper strip 20 is fed from a supply roll 51, between feed and pressure rolls 52 and 53, respectively. After leaving the latter, the strip is fed through a guideway 54 and past the printing station located between the sectors 16 and print hammers 55. Thereafter, the strip is guided upwardly behind a transparent tear-off bar 56.

The hammers 55 are suitably guided for endwise movement radially of the sectors 16 and toward and away from printing contact with the strip 20. Leaf spring elements 57 urge the hammers downwardly but are normally restrained by a rotatable cam element 58 which engages a cam follower 60 pivoted at 61 and effective to normally hold the springs and print hammers in their upper illustrated positions.

The cam 58 is entrained through gearing (not shown) with the main shaft 23, and during the printing phase which occurs at approximately 165 degrees (FIG. 23) the cam 58 permits the springs 57 to impel the hammers downwardly into printing engagement with the strip 20.

Accumulator

The accumulator is of the so-called "tumbling" type including a set of "add" gears 62 and a set of "subtract" gears 63 (FIGS. 1, 10, 11, 12 and 14). The gears are rotatably mounted independently of each other on respective shafts 64 and 65 carried by a cradle bail 66. Each of the accumulator gears has ten teeth which mesh with the aligned teeth of a neighboring gear of the opposite set and one of such teeth in each set, i.e., 62a and 63a, is wider than the rest to form a tens transfer tooth.

The cradle 66 is pivotally mounted on a support rod 67 which is slideable at its ends in elongated slots 68 formed in stationary frame plates 70, the slots extending toward the centers of the sectors 16 to permit movement of the cradle 66 radially of the sectors so as to effect meshing and demeshing of the "add" or "subtract" accumulator gears.

The ends of the shafts 64 and 65 are reduced in diameter, as shown at 64a and 65a and are received in arcuate slots 71 formed in the frame plates 70 to permit rocking of the cradle 66 so as to present either the add gears 62 or the subtract gears 63 to the sectors 16. The slots have notches, i.e., 72, therein to receive the ends 64a and 65a of the accumulator shafts to properly locate and hold the selected accumulator gears when in mesh with the printing sectors 16.

An aligner 73 (FIGS. 1, 13 and 14) extending the length of the accumulator, is provided with spaced aligning edges 75 and 76 adapted to engage between the teeth of the two sets of accumulator gears when the latter are moved out of mesh with the sector gear teeth as shown in FIG. 1. Shafts 78 and 79 extend through the aligner and are guided at opposite ends in arcuate slots, i.e., 81, formed in the side plates 70 to permit rocking of the aligner when the accumulator is tumbled. Shafts 78 and 80 also extend through triangular openings 82 and 83, respectively, formed in the sides of the cradle 66 so as to cause the cradle to rock with the aligner but yet permit transverse movement of the cradle relative to the aligner to mesh and demesh the accumulator gears (see FIGS. 11 and 12).

Means are provided for tumbling the accumulator between its "add" position shown in FIGS. 10 and 14 and its "subtract" position shown in FIGS. 11 and 12, when out of mesh with the sectors 16. For this purpose, a stud 80 (FIG. 9) extends through a side plate 70 and is held within a bifurcated arm 84 of a bail 85 which is pivotally supported at 86 and urged clockwise by a tension spring 87. Normally, the bail 85 is held in a counterclockwise rocked position so as to hold the accumulator in its "add" condition by means of a latch 92 (FIGS. 2, 17, 18 and 21). When the latch is rocked to release the bail 85, the spring 87 becomes effective to rock the same clockwise thus rocking the accumulator into its subtract position. Invariably, at the start of each machine cycle, a cam 88 engages the bail 85 to return the accumulator to add condition if it were previously rocked to subtract condition.

Tens transfer mechanism

As shown in FIGS. 1 and 10, each printing sector 16 is notched at 93 to receive part of a transfer sector 94. The latter is pivoted on the shaft 32 directly adjacent its respective sector 16 and is urged counterclockwise relative to the main sector by a spring tail 95 which engages a stud 96 on the main sector.

Normally, a shouldered tail 97 on each transfer sector is engaged by a blocking shoulder 98 formed on a respective transfer latch 100 so as to prevent each transfer sector from following its associated main sector 16 as the latter moves from a zero position into a sub-zero position shown in FIGS. 1 and 10.

The transfer latches 100 are independently pivoted on a rod 101 and each is yieldably held in either its latching position shown in FIG. 1 or in a counterclockwise rocked position, wherein it releases the transfer sector 94, by a detent 102 pivoted at 103 and urged clockwise by a tension spring 104 to engage either of two adjacent notches 99 in the latch.

During a digitizing or digit entry operation and when a transfer tooth, i.e., 62a on an accumulator gear, moves between a "9" and "0" registering position, such tooth will engage a camming portion 99 of the transfer latch associated with the next higher denomination order sector 16, thus moving it from blocking relation with the tens transfer sector 94 cooperating with the latter sector. Accordingly, as the sector 16 is driven into its home or sub-zero position, shown in FIG. 10, its transfer sector will be allowed to follow so as to drive the associated accumulator gear one additional increment to effect the carry operation.

Fugitive one mechanism

As noted hereinbefore, the present machine is provided with means for taking true negative totals and sub-totals and in order to properly obtain such totals, provision is made for transferring a "fugitive one" from the highermost denominational order to the lowermost order upon occurrence of an overdraft in either direction. That is, when an amount being subtracted is greater than that registered by the accumulator a negative overdraft will occur and the subtract accumulator gears in those orders to the left of those being digitized will turn from "0" to "9" registration.

Accordingly, the highermost denominational order transfer latch 100a (FIG. 13) will be tripped. The latter forms one arm of a bail 137 (see also FIG. 15) which extends across the accumulator and has at its opposite arm a transfer latch 100b associated with the lowermost denominational order. Thus, upon an overdraft, the unit 1 will be entered into the lowermost order of the accumulator either additively or subtractively depending on whether a positive or negative overdraft has occured.

Means are provided for restoring all of the transfer latches 100 which may have been tripped to effect a tens transfer in a preceding cycle. For this purpose, a bail 130 (FIGS. 10 and 22) extends under all of the transfer latches and is pivotally supported on the rod 101. The bail is connected through a pin and slot coupling 131 to a cam follower 132 fulcrumed at 133 and held in cooperative engagement with a cam 134 by a tension spring 135. As indicated by Item 8 of FIG. 23 the latches are restored and held in restored position until approximately 165 degrees. Accordingly, the latches 100 will form zero stops to arrest the accumulator gears during totaling and sub-totaling operations.

Accumulator controls

The accumulator is meshed and demeshed from the printing sectors at different times in a machine cycle, as set forth in items 4, 5 and 6 of FIG. 23, depending upon whether additive or subtractive entries are being made, or whether totalling or subtotalling operations are being performed.

For this purpose, an accumulator control cam 105 (FIGS. 4, 6, 7 and 8) is provided. The latter is mounted on the cam shaft 23 and is provided with three laterally located camways 106, 107 and 108 extending therearound.

A cam follower bail 110 (FIGS. 4 and 7) is mounted on a stationary shaft 111 for both pivotal and longitudinal movement along the shaft. A follower nose 112 is formed on the bail to follow a selected camway. The bail 110 is connected through a pin-and-slot connection 113 (see also FIG. 4) to an accumulator engaging bail 114. The latter is provided with cam surfaces 115 which embrace opposite ends of the accumulator support shaft 67. Accordingly, when the bails 110 and 114 are cammed counterclockwise by a selected camway, against the action of a tension spring 116, they will cam the accumulator directly into mesh with the printing sectors 16.

It will be noted that the camways of cam 105 are separated by flanges 117 and that such flanges are broken away at 118 (FIGS. 6-8), permitting lateral shifting of the follower bail 110 into cooperative relation with any of the camways when the machine is in full cycle position.

Figure 16:
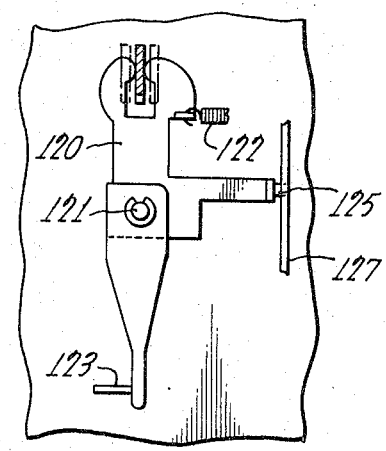
FIG. 16 is a sectional view of the accumulator engaging cam follower control linkage and is taken substantially along the line 16—16 of FIG. 1.

Means are provided for shifting the cam follower bail 110 into cooperative relation with any of the camways on cam 105. For this purpose, the bail 110 is engaged by a bifurcated lever 120 (FIG. 16) pivotally supported at 121 and urged clockwise by a tension spring 122, tending to locate the nose of the cam follower bail 110 in cooperative relation to the righthand camway 106. In such case, the accumulator would be meshed with the sectors 16 during the return or counterclockwise movements of such sectors, as occurs during additive and subtractive operations (see Item 6 of FIG. 23).

The pin carriage 35 carries an extension 123 which is engageable with the lever 120. When the pin carriage is in its home position, i.e., when no amount has been entered, it will position the lever 120 in its central position shown in FIG. 16 to locate the cam follower bail 110 in cooperative relation to the central camway 107 (FIG. 4).

In such case, the accumulator will be held in mesh with the sectors 16 throughout the clockwise and counterclockwise movements of the sectors, as occurs during subtotal operations (see Item 4 of FIG. 23).

When the lever 120 is rocked into a counterclockwise position, as by depression of the "minus-total" key 13 in a manner to be described later, and when the pin carriage is in its home position, the bail 110 will be moved into cooperative relation with the lefthand camway 108 to hold the accumulator in mesh with the sectors 16 during the forward or clockwise movement of the sectors, as occurs during totaling operations (see Item 5 of FIG. 23).

The lever 120 carries a stud 125 (FIGS. 2, 3, 17, 18 and 19) which extends into a slot 126 in a control link 127. Such stud assumes any of three positions 125a, 125b or 125c, corresponding to the positioning of the cam follower bail 110 in cooperative relation to the camways 106, 107 and 108, respectively. The slot 126 is formed to present a shoulder 128 which, under certain conditions, is effective to move the stud 125 and therefore the cam follower bail to different positions.

It should be noted that the cam follower bail 110 is located in any of its three positions by the conjoint positioning of the pin carriage in and out of its home position, by the extent of movement of the link 127 and by the vertical positioning of the link as will be described presently.

As shown particularly in FIGS. 2 and 3, the control link 127 is pivotally connected at 140 to a bail 141 which is pivotally supported on a frame stud 142. The bail 141 is normally held in engagement with an ear 143 of a second bail 144, also pivotally supported on stud 142, by a tension spring 145. Thus, the bails 141 and 144 tend to move about the stud 142 as a unit.

The key stem of the add-subtotal key 12 carries a pin 146 which, when the key is depressed, moves along a camming edge 147 of bail 144 thus rocking both bails counterclockwise to advance the link 127 rearwardly of the machine. This movement is limited to one-half of the total possible movement of the link 127 by means of an arm 148 which extends from the bail 141 and abuts a pin 150 on the stem of key 12 when the latter is depressed. Accordingly, a shoulder 151 defining part of the slot 126 and link 127 is effective to advance from its full line position shown in FIG. 17 to a central position 151a.

Upon depression of the minus-total key into its position shown in FIG. 3, a pin 152 on the stem thereof cams along a surface 153 of the bail 144, thereby rocking the same and bail 141 counterclockwise through its full travel. Accordingly, the link 127 will be advanced toward the rear of the machine to advance its shoulder 151 to its rearmost position 151b. Thus, if it is not allowed to drop to its lower position shown in FIG. 19 it will pick up the stud 125 and advance the same to its rearmost position 125c. The cam follower bail 110 will accordingly be moved to its leftmost position into cooperative relation with the total control camway 108.

It will be noted that depression of either of the keys 12 and 13 is effective to cause a cycle of operation of the machine and for this purpose a clutch control dog 154 (FIGS. 2 and 3) is operatively associated with the cyclic clutch 22. The clutch dog is pivoted on a frame stud 155 and is pivotally connected by a link 156 to a slide 157. The latter is supported for endwise movement by frame studs 158 which are embraced by elongated slots 160 in the slide.

Upon depression of key 12, the pin 150 thereon will engage a camming surface 161 on the slide 157 to cam the latter forwardly of the machine against the action of a tension spring 159 whereby to withdraw clutch dog 154 from blocking contact with the clutch and thus cause engagement of the clutch. Similarly, the pin 152 on the key stem of key 13 is effective upon depression of this key to advance the slide 157 to also withdraw the clutch control dog 154 to cause engagement of the clutch.

Means are provided to determine the setting of the accumulator into its add or subtract position in accordance with the particular control key depressed and upon the condition of the accumulator, i.e., whether it is in a positive or negative overdrafted condition. For this purpose, a latch 92 (FIGS. 2, 3, 17, 18 and 19) is formed as a bail pivotally supported on the rod 155. The latch pivotally supports a bell crank 173 at 172. The latter is connected by pin and slot connection 174 to a slide 175 having a bifurcated lower end slidable over the frame stud 155 and having its upper end slidabley received in a slot 170 formed in the bail portion of latch 92.

The bell crank 173 is provided with a pin 176 embraced by the curved slot 177 formed in a control link 178 (see also FIG. 20A). The link 178 is yieldably detentable into either of two positions and for this purpose has a V-shaped slot 180 embracing a frame stud 181. A tension spring 182 urges the link 178 downwardly to thus yieldably maintain one corner of the slot 180 in engagement with the stud 181.

The link 178 has a pair of spaced ears 183 and 184 thereon adapted to be engaged by cooperative ears 185 and 186, respectively, formed on a member 187 pivotally supported at 188 and integrally connected to the fugitive one entry bail 137.

Operation

Assuming that the accumulator registers a positive amount, in which case the link 178 will be held in its rearward position shown in FIG. 21, it will, through bell crank 173 hold the slide 175 in its upper position illustrated in that figure. Now, if an amount greater than that registered by the accumulator is to be subtracted, it is first entered through the keyboard and set up on the pin carriage, causing the latter to move out of its home position. In this case, the spring 122 (FIG. 16) will rock lever 120 clockwise to position the cam follower bail in cooperative relation with the add-subtract camway 106 and to locate the stud 125 in its forward position 125a (FIG. 17).

Due to the shape of the slot 126 in link 127, the latter will be allowed to drop under the action of a tension spring 195 into its position shown in FIG. 19 to locate an actuating nose 196 thereon in line with an ear 197 of a bell crank 198. The latter is fulcrumed on the stud 155 and carries a pin 200 loosely embraced by a slot 201 in the link 178. Also, at this time a shelf 202 on the link is lowered into its position indicated by dot-and-dash lines 202a (FIG. 21).

Now, when the minus-total key 13 is depressed, the link 127 will be moved rearward its fullest extent causing the nose 196 to rock bell crank 198 counterclockwise to lower the link 178 so as to align the ear 183 thereon with the ear 185 of member 187 and to remove the ear 184 from alignment with ear 186 as shown in FIG. 19. At the same time, the shelf 202 will engage the forward edge of slide 175 to rock the latch 92 against the action of a tension spring 199 thus releasing the accumulator to tumble to its subtract position, bringing the subtract accumulator gears into cooperative alignment with the sectors 16. Since the upper portion of the slot 126 now embraces the stud 125 the latter will still remain in its forward position 125a, leaving the cam follower bail 110 cooperating with the add-subtract control camway 106.

Upon reaching a negative overdrafted condition, the bail 137 (FIG. 13) is rocked counterclockwise to cause entry of the fugitive one in the lowermost denominational order accumulator gears and to cause member 187 to engage ear 183 and thus shift the link 178 forward into its position shown in FIGS. 17, 18 and 19. This will lower the slide 175 to its position shown in the latter figures.

Upon completion of the cycle the pin carriage is returned to its home position causing the lever 16 to return the cam follower bail to cooperate with the subtotal control camway 107 of cam 105. Also, the link 127 will be raised to its normal position.

If it should be desired to obtain a true negative total at this time, the minus-total key 13 is again depressed causing the shoulder 151 on the link 127 to drive the stud 125 rearward to its position 125c, thereby setting the cam follower bail 110 in cooperative relation with the total control camway 108. During this rearward movement the link 127 is prevented from dropping into its position shown in FIG. 19 by a lever 210 pivotally supported at 211 and underlying an ear 122 formed on the link 127. Accordingly, the shelf 202 will move rearward to its position shown by dotted lines 202b of FIG. 17 to again release the latch 92, permitting the accumulator to tumble counterclockwise, locating the subtract accumulator gears 63 in position to mesh with the sectors 16.

During the ensuing totaling operation, the subtract accumulator gears will advance counterclockwise until the transfer teeth 63a are arrested by the latches 100, thereby arresting the sectors in positions indicative of the true negative totals registered by the accumulator. During the printing phase, such totals will be printed.

In the event a true negative subtotal were desired in lieu of a true negative total in the foregoing example, the add-subtotal key 12 would be depressed. In this case, the link 127 is moved rearward only one-half of its full range of movement. This will allow the cam follower bail 110 to locate in cooperative relation with the subtotal camway 107. Also, the shelf 202 of link 127 will be moved rearward to its position indicated by the dot-dash lines 202c in FIG. 17. This movement is sufficient to rock the latch 92 and thus release the accumulator to move to its subtract position.

Assume now a condition in which the accumulator registers a negative amount and an amount greater than this is to be added. Accordingly, the link 178 will be located in its position shown in FIG. 19, thereby holding the slide 175 in its lowermost position also shown in this figure.

When the amount to be added is entered into the machine, the pin carriage will move out of its home position permitting the bail 110 to move in cooperative relation with the add-subtract camway 106. As the stud 125 (FIG. 17) moves into its foremost position 125a the link 127 will drop into its lower position, locating its shelf 202 in the dot-dash line position 202d and locating its nose 196 in line with the ear 197 of bell crank 198.

Now, when the add-subtotal key 12 is depressed, the link 127 will be moved rearwardly through one-half of its range of movement. Thus, its nose 196 will be ineffective to rock the bell crank 198 and the shelf 202 will move to its position 202e which will also be ineffective to release the latch 92. Therefore, the accumulator will remain in its normal add condition and the amount will be added thereinto.

When a positive overdraft occurs, the fugitive one entry bail 137 will be rocked counterclockwise in the same manner as described heretofore during a negative overdraft to enter the fugitive one into the units denominational order accumulator gears. Accordingly, the ear 186 of lever 187 will engage ear 184 of link 178, forcing the latter rearward to its position shown in FIG. 21. The slide 175 will therefore be raised.

At the end of the cycle, the pin carriage is returned to its home position and since the key 12 is allowed to rise, the link 127 will be retracted causing a camming surface 241 of the slot 126 to cam the link 127 over the stud 125, causing it to assume its upper position shown in FIG. 17.

Subsequent depression of the minus-total key 13 to effect a totaling operation will cause the shoulder 151 of the link 127 to move the stud 125 into its rearmost position 125c, thus setting the cam follower bail 110 into cooperative relation with the total camway 108.

A notch 242 in the slide 175 will now be aligned with the shelf 202 of the link 127 so that as the latter is moved rearwardly it will be ineffective to release the latch 92, thus the add accumulator gears will be driven counterclockwise to obtain a positive total.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. In a calculating machine having an accumulator, differential actuators therefor, and
a pin carriage for controlling said actuators,
the combination of means normally causing said actuators to advance said accumulator in one direction, including a control member having a notched edge;
said control member being movable in a first direction to cause said actuators to advance said accumulator subtractively,
means responsive to an overdraft for moving said control in a second direction substantially at right angles to said first direction from a first position to a second position,
an actuating member engageable with said notched edge,
means responsive to setting of amounts in said pin carriage for moving said actuating member in a direction substantially parallel to said second direction from one position to another, and
means for moving said actuating member substantially in said first direction, said actuating member being effective to engage said notched edge in certain combinations of said positions only of said control member and said actuating member.

2. In a calculating machine having an accumulator, differential actuators therefor, and
a pin carriage for controlling said actuators,
the combination of means normally causing said actuators to advance said accumulator in one direction,
means including a control member having an irregular edge;
said control member being movable in a first direction to cause said actuators to advance said accumulator in the opposite direction,
means responsive to an overdraft for moving said control member in a second direction substantially at right angles to said first direction from a first position to a second position,
an actuating member engageable with said irregular edge,
means responsive to setting of amounts in said pin carriage for moving said actuating member in a direction substantially parallel to said second direction from one position to another, and
means for moving said actuating member substantially in said first direction,
said actuating member being effective to engage said irregular edge and to move said control member in certain combinations of said positions only of said control member and said actuating member.

3. In a calculating machine having an accumulator, differential actuators therefor,
a pin carriage including settable stop pins for controlling said actuators, and
means responsive to setting of a said pin for moving said pin carriage out of home position;
the combination of means normally causing said actuators to advance said accumulator in one direction, including a control member having an irregular edge;
said control member being movable in a first direction to cause said actuators to advance said accumulator subtractively, means responsive to an overdraft for moving said control member in a second direction substantially at right angles to said first direction from a first position to a second position,
an actuating member engageable with said irregular edge,
means controlled by said pin carriage upon movement out of said home position for moving said actuating member in a direction substantially parallel to said second direction from one path to another, and
means including a depressible key for moving said actuating member in either of said paths,
said actuating member being effective to engage said irregular edge in a certain position only of said control member and in a certain path only of said actuating member.

4. In a calculating machine having an accumulator, differential actuators therefor, and
a pin carriage for controlling said actuators,
the combination means normally causing said actuators to advance said accumulator additively,
means including a control member having an irregular edge movable in a first direction to cause said actuators to advance said accumulator subtractively,
means responsive to a negative overdraft for moving said control member in a path substantially at right angles to said direction to a first position,
said last mentioned means being responsive to a positive overdraft for moving said control member in said path to a second position,
an actuating member engageable with said irregular edge,
means responsive to entry of an amount in said pin carriage for moving said actuating member in a direction at least substantially parallel to said second direction from one position to another,
a depressible control key, and
means responsive to depression of said key for moving said actuating member at least substantially in said first direction,
said actuating member being ineffective in certain combinations of positions of said control member and said actuating member to move said control member.

5. In a calculating machine having an accumulator, differential actuators therefor, and
a pin carriage for controlling said actuators,
the combination of means normally causing said actuators to advance said accumulator additively,
means including a control member having a notched edge movable in a first direction to cause said actuators to advance said accumulator subtractively;
means responsive to a negative overdraft for moving said control member in a path substantially at right angles to said first direction to a first position,
said last mentioned means being responsive to a positive overdraft for moving said control member in said path to a second position,
an actuating member engageable with said notched edge,
means responsive to entry of an amount in said pin carriage for moving said actuating member in a direction at least substantially parallel to said second direction from one position to another,
a first depressible control key,
a second depressible control key, and
means responsive to depression of said first key for moving said actuating member at least substantially in said first direction a predetermined amount,
said last mentioned means being responsive to depression of said second key for moving said actuating member a second predetermined amount,
said actuating member being ineffective in certain combinations of positions of said control member and said actuating member and upon movement of said actuating member certain of said predetermined amounts to move said control member.

6. In a calculating machine having an accumulator, differential actuators therefor, and
a pin carriage for controlling said actuators,
the combination of means normally causing said actuators to advance said accumulator in one direction,
means including a control member movable in a first direction to cause said actuators to advance said accumulator in a direction opposite said first direction;
means responsive to an overdraft in said one direction for moving said control member in a path substantially at right angles to said first position,
said last mentioned means being responsive to an overdraft in said opposite direction for moving said control member in said path to a second position,
an actuating member engageable with said control member,
means responsive to entry of an amount in said pin carriage for moving said actuating member in a direction substantially parallel to said second direction from one position to another,
a depressible control key, and
means responsive to depression of said key for moving said actuating member at least substantially in said first direction,
said actuating member being ineffective in certain combinations of positions of said control member and said actuating member to move said control member.

7. In a calculating machine having an accumulator, differential actuators therefor, and
a pin carriage for controlling said actuators,
the combination of means normally causing said actuators to advance said accumulator in one direction,
means including a control member having an irregular edge movable in a first direction to cause said actuators to advance said accumulator in a direction opposite said first direction;
means responsive to an overdraft in said one direction for moving said control member in a path substantially at right angles to said first position,
said last mentioned means being responsive to an overdraft in said opposite direction for moving said control member in said path to a second position,
an actuating member engageable with said irregular edge,
means responsive to entry of an amount in said pin carriage for moving said actuating member in a direction substantially parallel to said second direction, from one position to another,
a first depressible control key,
a second depressible control key, and
means responsive to depression of said first key for moving said actuating member at least substantially in said first direction a predetermined amount,
said last mentioned means being responsive to depression of said second key for moving said actuating member a second predetermined amount,
said actuating member being ineffective in certain combinations of positions of said control member and said actuating member and upon movement of said actuating member certain of said predetermined amounts to move said control member.

8. In a calculating machine having an accumulator, differential actuators therefor, and
a pin carriage for controlling said actuators,
the combination of control mechanism settable in one condition to cause said actuators to advance said accumulator additively and settable in a second condition to cause said actuators to advance said accumulator subtractively,
spring means for maintaining said control mechanism in one of said conditions, a latch for maintaining said control mechanism is the other of said conditions, means including a control member having a notched edge, said control member being movable in a first direction to release said latch, means responsive to a negative overdraft for moving said control member in a second direction substantially at right angles to said first direction to a first position, said last mentioned means being responsive to a positive overdraft for moving said control member in a direction opposite said second direction to a second position, an actuating member engageable with said notched edge, means responsive to entry of amounts in said pin carriage for moving said actuating member in a direction at least substantially parallel to said second direction from one position to another, a depressible control key, and means responsive to depression of said key for moving said actuating member substantially in said first direction, said actuating member being ineffective in certain combinations of positions of said control member and said actuating member to move said control member.

9. In a cyclically operable calculating machine having an accumulator, differential actuators therefor, and a pin carriage for controlling said actuators, the combination of control mechanism settable in one condition to cause said actuators to advance said accumulator additively and settable in a second condition to cause said actuators to advance said accumulator subtractively, spring means for maintaining said control mechanism in one of said conditions, a latch for maintaining said control mechanism is the other of said conditions, means including a control member having a notched edge, said control member being movable in a first direction to release said latch, means responsive to a negative overdraft for moving said control member in a second direction substantially at right angles to said first direction to a first position, said last mentioned mean being responsive to a positive overdraft for moving said control member in a direction opposite said second direction to a second position, an actuating member engageable with said notched edge, means controlled by said pin carriage upon entry of amounts therein for moving said actuating member in a direction at least substantially parallel to said second direction from one position to another, a depressible control key, means responsive to depression of said key for causing a cycle of operation and for moving said actuating member at least substantially in said first direction, said actuating member being ineffective in certain combinations of positions of said control member and said actuating member to move said control member, and means operable during said cycle for moving said control mechanism to said other condition.

10. In a calculating machine having an accumulator, differential actuators therefor, and a pin carriage for controlling said actuators, the combination of means settable in one condition for causing said actuators to advance said accumulator additively, said means being settable in a second condition for causing said actuators to advance said accumulator subtractively, yieldable means for setting said first mentioned means in one of said conditions, a latch for normally holding said first mentioned means in the other of said conditions, means including a control member having a notched edge movable in one direction to release said latch, an actuating member engageable with said notched edge, means responsive to entry of amounts in said pin carriage for moving said actuating member in a second direction substantially at right angles to said one direction from a first position to a second position, means responsive to an overdraft and operable only when said actuating member is in said other position for setting said control member in said second position, a depressible key, and means responsive to depression of said key for moving said actuating member at least substantially in said first direction.

11. In a calculating machine having an accumulator, differential actuators therefor, and a pin carriage for controlling said actuators, the combination of means settable in one condition for causing said actuators to advance said accumulator additively, said means being settable in a second condition for causing said actuators to advance said accumulator subtractively, yieldable means for setting said first mentioned means in one of said conditions, a latch for normally holding said first mentioned means in the other of said conditions, means including a control member having a notched edge movable in one direction to release said latch, an actuating member engageable with said notched edge, means responsive to entry of amounts of said pin carriage for moving said actuating member in a second direction substantially at right angles to said one direction from a first position to a second position, means responsive to an overdraft for setting said control member in said second position, a first depressible key, a second depressible key, and means responsive to depression of said first key for moving said actuating member at least substantially in said one direction a predetermined amount, said last mentioned means being responsive to depression of said second key for moving said actuating member at least substantially in said one direction a second predetermined amount, said actuating member being ineffective when moved in response to certain of said keys and in certain combinations of positions of said control member and said actuating member to move said control member.

12. In a calculating machine having an accumulator comprising a set of add gears and a set of subtract gears, a tumbling frame supporting said gears, differential actuators for said gears, and a pin carriage for controlling said actuators, the combination of spring means for setting said frame in a first position to present one of said sets of gears to said actuators, means for setting said frame in a second position to present the other of said sets of gears to said actuators, a latch for latching said frame in said second position, a control member carried by said latch, said control member having a notched edge, said control member being movable in one direction to release said latch, means responsive to entry of amounts in said pin carriage for moving said actuating member in a direction substantially at right angles to said one direction from a first position to a second position, means responsive to an overdraft and operable only when said actuating member is in said second position for setting said control member in said second position, a first depressible key, a second depressible key, means responsive to depression of said first key for moving said actuating member substantially in said one direction a predetermined amount, said last mentioned means being responsive to depression of said second key for moving said actuating member substantially in said one direction a second predetermined amount, said actuating member being ineffective when moved in response to certain of said keys and in certain combinations of positions of said control member and said actuating member to move said control member.

13. In a cyclially operable calculating machine having an accumulator comprising a set of add gears and a set of subtract gears, a tumbling frame supporting said gears, differential actuators for said gears, and a pin carriage for controlling said actuators, the combination of spring means for setting said frame in a first position to present one of said sets of gears to said actuators, means for setting said frame in a second position to present the other of said sets of gears to said actuators, a latch for latching said frame in said second position, a control member carried by said latch, said control member having a notched edge, an actuating member engageable with said notched edge, means responsive to entry of amounts in said pin carriage for moving said actuating member in a second direction substantially at right angles to said one direction from a first position to a second position, means responsive to an overdraft and operable only when said actuating member is in said other position for setting said control member in said second position, a first depressible key, a second depressible key, means responsive to depression of each of said keys for initiating a cycle of operation of said machine, means operable during each said cycle and after actuation of said accumulator by said actuators for setting said frame in said first position, and means responsive to depression of said first key for moving said actuating member substantially in said one direction a predetermined amount, said last mentioned means being responsive to depression of said second key for moving said actuating member substantially in said one direction a second predetermined amount, said actuating member being ineffective when moved in response to certain of said keys and in certain combinations of positions of said control member and said actuating member to move said control member.

14. In a calculating machine having an accumulator, differential actuators therefor, and a pin carriage for controlling said actuators, the combination of means normally causing said actuators to advance said accumulator in one direction, including a control member having a notched edge;

said control member being movable in a first direction to cause said actuators to advance said accumulator subtractively, means responsive to an overdraft for moving said control member in a second direction substantially at right angles to said first direction from a first position to a second position, an actuating member engageable with said notched edge, means responsive to setting of amounts in said pin carriage for moving said actuating member in a direction substantially parallel to said second direction from one position to another, and blocking means for preventing said parallel movement when said actuating member is located at certain positions relative to said blocking means, means for moving said actuating member to said certain positions substantially in said first direction, said actuating member being effective to engage said notched edge in certain combinations of said positions only of said control member and said actuating member.

References Cited by the Examiner

UNITED STATES PATENTS

| | | | |
|---|---|---|---|
| 2,371,914 | 3/1945 | Rauh | 235—60 |
| 3,061,186 | 10/1962 | Gelling | 235—60.2 |
| 3,113,719 | 10/1963 | Bursch | 235—60.31 |

RICHARD B. WILKINSON, *Primary Examiner.*

STANLEY A. WAL, *Assistant Examiner.*